US012695330B2

(12) United States Patent　(10) Patent No.:　US 12,695,330 B2
Suarez Sandoval et al.　(45) Date of Patent:　Jul. 28, 2026

(54) WIRELESS POWER TRANSMITTER INCREASING UNIFORMITY OF ELECTROMAGNETIC FIELD DISTRIBUTION

(71) Applicant: Huawei Digital Power Technologies Co., Ltd., Shenzhen (CN)

(72) Inventors: Fralett Suarez Sandoval, Munich (DE); Sarai Malinal Torres Delgado, Munich (DE)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/976,758

(22) Filed: Dec. 11, 2024

(65) Prior Publication Data

US 2025/0112502 A1　Apr. 3, 2025

Related U.S. Application Data

(63) Continuation of application No. PCT/EP2022/066004, filed on Jun. 13, 2022.

(51) Int. Cl.
*H02J 50/12*　(2016.01)
*H02J 50/40*　(2016.01)

(52) U.S. Cl.
CPC ............ *H02J 50/12* (2016.02); *H02J 50/402* (2020.01)

(58) Field of Classification Search
USPC ........................................................ 307/104
See application file for complete search history.

(56) References Cited

U.S. PATENT DOCUMENTS

2013/0154383 A1　6/2013　Kasturi et al.
2016/0211702 A1*　7/2016　Muratov ................. H01F 27/38
2018/0048188 A1　2/2018　Karalis et al.
(Continued)

FOREIGN PATENT DOCUMENTS

CN　105706334 B　1/2019
CN　109478794 B　12/2021
(Continued)

OTHER PUBLICATIONS

Alex Pacini et al:"Load- and Position-Independent Moving MHz WPT System Based on GaN-Distributed Current Sources",IEEE Transactions on Microwave Theory and Techniques, vol. 65, No. 12, Dec. 2017, total 10 pages.
(Continued)

*Primary Examiner* — Joseph Chang
(74) *Attorney, Agent, or Firm* — Conley Rose, P.C.

(57)　ABSTRACT

A wireless power transmitter increases uniformity of a generated electromagnetic field distribution in a direction perpendicular to a planar plane and powers at least one electronic device from the generated electromagnetic field. The wireless power transmitter comprises a transmitter coil comprising at least one coil turn for generating an electromagnetic field. At least one coil turn of the transmitter coil extends along a plurality of first linear sections and a plurality of second linear sections electrically connected with each other. The first linear sections are arranged to enclose a planar plane of the transmitter coil and the second linear sections are formed to extend angularly to the planar plane.

20 Claims, 15 Drawing Sheets

(56) References Cited

U.S. PATENT DOCUMENTS

| | | | |
|---|---|---|---|
| 2021/0075263 A1 | 3/2021 | Yang et al. | |
| 2023/0075393 A1* | 3/2023 | Shi | H02J 50/80 |

FOREIGN PATENT DOCUMENTS

| | | |
|---|---|---|
| DE | 102015118704 A1 | 6/2016 |
| JP | 2015228787 A | 12/2015 |
| KR | 20130102218 A | 9/2013 |
| KR | 20160001816 A | 1/2016 |
| KR | 20200000375 A | 1/2020 |
| WO | 2009155000 A2 | 12/2009 |
| WO | 2010118191 A1 | 10/2010 |
| WO | 2012092205 A2 | 7/2012 |
| WO | 2014109460 A1 | 7/2014 |
| WO | 2014113391 A3 | 4/2015 |
| WO | 2017044973 A1 | 3/2017 |
| WO | 2017112071 A1 | 6/2017 |

OTHER PUBLICATIONS

Essam Elkhouly et al:"Transmitter Coil Design for Resonant Wireless Power Transfer", Oct. 4-6, 2016, total 5 pages.

Eberhard Waffenschmidt et al:"Free positioning for inductive wireless power system", Sep. 17-22, 2011, total 8 pages.

J. Kim et al:"Multi-loop coil supporting uniform mutual inductances for free-positioning WPT", Mar. 14, 2013 vol. 49 No. 6, total 2 pages.

Joaquin J. Casanova et al:"Transmitting Coil Achieving Uniform Magnetic Field Distribution for Planar Wireless Power Transfer System", Jan. 18-22, 2009, total 4 pages.

AFA TS-0010-A v3.00, Apr. 14, 2021, AirFuel Alliance Resonant Wireless Power Transfer (WPT) System Baseline System Specification (BSS), total 100 pages.

AFA TS-0010-A v2.00, Jul. 25, 2018, AirFuel Alliance Resonant Wireless Power Transfer (WPT) System Baseline System Specification (BSS), Link through members: https://docsend.com/view/m28dwdgmqpw6bm3d, pp. 31-32.

* cited by examiner

☐ Flexible carrier substrate

▨ Rigid carrier substrate

1300

1301 — providing a planar carrier substrate extending along a planar plane

1302 — providing a plurality of carrier substrate extensions extending downwards to the planar plane 1303 — forming a transmitter coil comprising at least one coil turn, the at least one coil turn extending on the planar carrier substrate and the carrier substrate extensions

WIRELESS POWER TRANSMITTER INCREASING UNIFORMITY OF ELECTROMAGNETIC FIELD DISTRIBUTION

CROSS-REFERENCE TO RELATED APPLICATIONS

This is a continuation of International Patent Application No. PCT/EP2022/066004 filed on Jun. 13, 2022, the disclosure of which is hereby incorporated by reference in its entirety.

TECHNICAL FIELD

The disclosure relates to the field of wireless power transfer. In particular, the disclosure relates to a wireless power transmitter for increasing uniformity of a generated electromagnetic field distribution and a method for manufacturing such a transmitter. The disclosure particularly relates to a wireless power transfer device and fabrication methods thereof.

BACKGROUND

The major engineering challenge in existing wireless power transfer systems to recharge battery-powered devices is the reduced positioning freedom of the target device(s). Making this type of technology highly sensitive to lateral or angular misalignments between the transmitter and receiver devices is causing that the receiver device is not properly charged or even not charged at all in some locations, and in the worst case, the receiver device can actually be damaged when placed in a zone that presents him with a high coupling factor to the transmitter.

Given the increasing number of personal electronic devices, it would be beneficial to have a transmitter device capable of supporting several receiver devices simultaneously regardless of their relative location in space and their specific power demands. The power demands of a receiver device can be different according to the charging status of the battery.

SUMMARY

This disclosure provides a solution for wireless power transfer systems subjected to a very large coupling-factor variation as in systems in which the transmitter is used to provide simultaneous wireless power to receivers located close (contact) and far from the transmitter.

The solution ensures that the transmitter device works at a current level high enough to provide usable power to receivers located far away while at the same time not damages receivers located very close to it.

The foregoing and other objects are achieved by the features of the independent claims. Further implementation forms are apparent from the dependent claims, the description and the figures.

The solution presented in this disclosure introduces a geometry of a substantially flat transmitter coil meant for contact and distance (medium range) wireless charging: a number of turns of conductive material wherein each turn has four vertices; wherein at least the four vertices of a single turn are displaced with a certain height relative to the main coil plane.

Displacing the vertices of the coil decreases the mutual inductance in critical zones when the receiver is located directly on top of the transmitter device's shell. Decreasing these maximum peaks of mutual inductance reduces the variations of the induced voltage in the receiver, as well as the maximum component stresses in the receiver avoiding possible damage of the receiver while allowing the transmitter to work with a constant current level, a necessary feature in one-to-many wireless power transfer systems. Exemplary implementations of this coil geometry are also disclosed.

Efficient wireless power transmission is ensured at any operating state since the resonator circuit made by the coil geometry and either an added capacitance element or due to its own parasitic capacitance has a very similar resonance frequency as the operating frequency of the wireless power system. Moreover, the solution presented herein allows the use of a power amplifier on the transmitter side operating as a constant current source, in fact that facilitates the power delivery to several receiver devices simultaneously. The use of a current source on the transmitter side is desirable as its power consumption when no receiver devices are present, i.e., during the unloaded operation, is low. The power consumption depends on the resistive characteristics of the transmitter resonator and the associated circuitry.

In order to describe the disclosure in detail, the following terms and notations will be used.

WPT: wireless power transfer

PCB: printed circuit board

DC: direct current

AC: alternating current.

In this disclosure, WPT systems are described, in particular one-to-one WPT systems, one-to-many WPT systems, many-to-one WPT systems and many-to-many WPT systems.

One-to-one WPT systems are wireless power transfer systems composed by a single transmitter and a single receiver device. One-to-many WPT systems are wireless power transfer systems composed by a single transmitter and multiple receiver devices. Many-to-one WPT systems are wireless power transfer systems composed by multiple transmitter and a single receiver device. Many-to-many WPT systems are wireless power transfer systems composed by multiple transmitter and multiple receiver devices.

Wireless power transfer is the transmission of electrical energy without the use of wires as a physical link. This technology uses a transmitter device capable of generating a time-varying electromagnetic field that causes a circulating electric field through a receiver device (or devices) based on the principle of electromagnetic induction. The receiver device (or devices) is (are) capable of being supplied directly from this circulating electric field or they convert it to a suitable power level to supply to an electrical load or battery connected to them.

In the context of wireless power transfer systems, different technologies, such as multifrequency WPT systems, time-sharing WPT systems, multiple coils and space-divided WPT systems, reconfigurable WPT systems, WPT transmitters with uniform charging area and spatial high mutual inductance peaks avoidance can be applied.

Multifrequency WPT systems have the capability to tune the frequency of operation of the transmitter or the receiver resonators or both, in such a way that power transmission is realized to a specific receiver device tuned to resonate at a particular frequency that is different from another receiver device.

Time-sharing WPT systems can work at a constant frequency of operation at the transmitter side but control the magnitude and phase of the excitation at the transmitter side in order to improve the wireless transmission of power to a certain receiver device with a certain location or charge condition.

Multiple coil and space-divided WPT systems implement multiple transmitter resonators that are located in space sufficiently apart from each other in order to create one-to-one WPT systems to different receiver resonators. Multiple resonators can also be implemented on the receiver device and are selectively activated according to a better electromagnetic coupling condition to the transmitter device.

Reconfigurable WPT systems have reconfiguration capabilities like adjusting the relative position of intermediate resonators meant to provide an impedance matching between a transmitter and a receiver device. For example, whenever the receiver device has changed its spatial location, i.e., has changed its electromagnetic coupling to the transmitter, a matching network with reconfiguration capabilities can be implemented in the transmitter or receiver devices.

WPT transmitters with uniform charging area apply winding structures and combinations thereof having the ability to generate a uniform wireless charging area. This can be achieved by having transmitter coils with differing winding parameters in different turns, for example, the spacing between the turns or the width of the conductor can be different from one turn of the coil to the next.

WPT systems with spatial high mutual inductance peaks avoidance prevent the user from locating the receiver device nearby zones of high mutual inductance. Prevention can be achieved via a visual recommendation on the valid charging area and by not supporting operation over zones outside such area.

In the following, wireless power transmission systems are described in more detail.

Nowadays the number of battery-powered electronic devices is increasing rapidly because they provide freedom of movement and portability. These devices should be continuously recharged to ensure they function. Their charging frequency can be diminished by the use of a large battery, but these impact the overall cost of the electronic device, as well as their weight and size.

Charging of battery-powered electronic devices is usually done with the use of a wall charger and a dedicated cable that connects to an input port of the device to be charged to establish an electrical connection between the power supply and the power-hungry device. Some disadvantages of this charging mechanism are summarized as: a) the connector at this input port is susceptible to mechanical failure due to the connection/disconnection cycles required to charge the battery; b) each battery-powered device comes with its dedicated cable and wall charger. These two components function sometimes exclusively with each device and are not interchangeable between devices. This increases the cost of the device and the electronic-waste generated by the nonfunctional wall chargers and cables; c) the production of waterproof devices becomes more challenging due to the higher cost associated with the enclosure required around the input port of the battery-powered electronic device; and d) the use of a cable restricts the mobility of the user according to the length of the charging cable.

In order to avoid these disadvantages, several methods for wireless power transmission to recharge the battery of the electronic device without the use of a charging cable have been proposed in recent history.

Commercial wireless power transfer systems have mainly been driven by two organizations, the Wireless Power Consortium and the AirFuel Alliance. The Wireless Power Consortium created the Qi Standard to wirelessly charge consumer electronic devices using magnetic induction from a base station, usually a thin mat-like object, containing one or more transmitter inductors and a target device fitted with a receiving inductor. Qi systems require close proximity of the transmitter and receiver devices, usually within a couple of millimeters to a couple of centimeters.

Wireless power transfer systems that function under the AirFuel Alliance principle use a resonant inductive coupling between the transmitter inductor and the receiver inductor to consequently charge the battery connected to the receiver device. The resonant coupling allows for the power to be transferred over greater distances. The overall system efficiency is a function of the resonators' quality factor and the coupling factor between their inductive elements.

According to a first aspect, the disclosure relates to a wireless power transmitter for increasing uniformity of a generated electromagnetic field distribution in a direction perpendicular to a planar plane and for powering at least one electronic device from the generated electromagnetic field, the wireless power transmitter comprising: a transmitter coil comprising at least one coil turn for generating an electromagnetic field; wherein at least one coil turn of the transmitter coil extends along a plurality of first linear sections and a plurality of second linear sections electrically connected with each other, wherein the first linear sections are arranged to enclose a planar plane of the transmitter coil and wherein the second linear sections are formed to extend angularly to the planar plane.

The following advantages can be achieved by such a wireless power transmitter. The substantially planar shape of the first linear sections allows for such a transmitter coil to be used in substantially planar transmitter devices in which the overall height of the device is restricted. Moreover, the angular extension of the second linear sections increases uniformity of the generated electromagnetic field distribution, in particular in direction perpendicular to the planar plane.

In an exemplary implementation of the wireless power transmitter, the first linear sections are arranged alternately with every two contiguous second linear sections.

These two contiguous second linear sections form respective corners of the coil. By bending these corners, the advantage of increased uniformity of the generated electromagnetic field distribution can be achieved.

In an exemplary implementation of the wireless power transmitter, the at least one coil turn of the transmitter coil forms a polygonal geometric figure whose corners are bent angularly to the planar plane.

The term "bent angularly" means that the corners are extending under an angle from the planar plane.

The bending of the corners of the coil changes the mutual inductance to the receiver coil. This provides the advantage of limiting the sent power to a desired and safe level when located too close to the transmitter. It allows to use smaller rated components on the receiver modules instead of using largely-rated components when supporting power transfer at zones with high mutual inductance. It reduces the maximum mutual inductance to a fraction of the minimum observed at the immediate surface above the transmitter coil. Thus, a faster decay of the mutual inductance outside of the immediate surface above the transmitter coil can be achieved. The bending of the corners allows to still have a large enough maximum dimension of the coil in order to have a large enough mutual inductance to a receiver device located away from the transmitter coil.

In an exemplary implementation of the wireless power transmitter, the corners of the polygonal geometric figure are bent to the planar plane under a positive angle or a negative angle.

The bending of the corners of the coil provides the above-described advantages, no matter if the corners are bent under a positive angle or a negative angle.

In an exemplary implementation of the wireless power transmitter, the corners of the polygonal geometric figure are bent to the planar plane at same height or at same depth.

This provides the advantage of a uniform field distribution of the electromagnetic field.

In an exemplary implementation of the wireless power transmitter, the corners of the polygonal geometric figure are bent away from the planar plane according to a predetermined slope profile.

The slope profile can be for example a step profile, an S-profile or any other geometric shape. As described above, this provides the advantage of limiting the sent power to a desired and safe level when located too close to the transmitter.

By displacing the vertices of the coil, the mutual inductance in critical zones decreases when the receiver is located directly on top of the transmitter device's shell. Decreasing these maximum peaks of mutual inductance reduces the variations of the induced voltage in the receiver, as well as the maximum component stresses in the receiver avoiding possible damage of the receiver while allowing the transmitter to work with a constant current level.

In an exemplary implementation of the wireless power transmitter, at least one second coil turn of the transmitter coil extends completely along the planar plane without a displacement from the planar plane.

This provides the advantage the bending depth does not limit the minimum size of the inner coil turns thereby increasing the mutual inductance to the receiver coil.

In an exemplary implementation of the wireless power transmitter, the at least one second coil turn of the transmitter coil is an inner coil turn with respect to the at least one coil turn of the transmitter coil.

When the second coil turns are inner coils, the (first) coil turns can be outer coils. By bending the outer coils, the advantage of increased uniformity of the generated electromagnetic field can be achieved.

In an exemplary implementation of the wireless power transmitter, the coil turns of the at least one coil turn of the transmitter coil have a different spacing and/or a different conductor width with respect to each other.

This configuration allows to further increase the uniformity of the generated electromagnetic field distribution, thereby avoiding having spatial mutual inductance peaks between the transmitter and the receiver coils.

In an exemplary implementation of the wireless power transmitter, the wireless power transmitter comprises a planar carrier substrate extending along the planar plane, the planar carrier substrate carrying the plurality of first linear sections of the at least one coil turn of the transmitter coil; and a plurality of carrier substrate extensions, the carrier substrate extensions carrying the plurality of second linear sections of the at least one coil turn of the transmitter coil.

This provides the advantage that the transmitter coil can be flexibly designed.

In an exemplary implementation of the wireless power transmitter, the planar carrier substrate comprises a plurality of corners at which the carrier substrate extensions are electrically and mechanically connected to the planar carrier substrate.

This provides the advantage that such a wireless power transmitter can be easily implemented by using a printed circuit board technology for both the planar carrier substrate and the carrier substrate extensions.

In an exemplary implementation of the wireless power transmitter, the carrier substrate extensions are formed from the plurality of corners of the planar carrier substrate which are bent to the planar plane.

In an exemplary implementation of the wireless power transmitter, the carrier substrate extensions are formed from rigid carrier substrates which are connected via respective flexible carrier substrates to the planar carrier substrate.

In an exemplary implementation of the wireless power transmitter, the carrier substrate extensions are formed from flexible carrier substrates which are connected to the planar carrier substrate.

In an exemplary implementation of the wireless power transmitter, the carrier substrate extensions are formed from rigid carrier substrates which are connected via respective connection modules to the planar carrier substrate.

In an exemplary implementation of the wireless power transmitter, the respective connection modules comprise at least one of the following: a third substrate with electrically conductive tracks, an array of conductive elements, a pin header, a combination of a male and a female pin header for electrically connecting the first linear sections on the planar carrier substrate with the second linear sections on the carrier substrate extensions.

In an exemplary implementation of the wireless power transmitter, the coil turns of the transmitter coil are angular, wherein corners of the coil turns are angular or rounded.

According to a second aspect, the disclosure relates to a method for manufacturing a wireless power transmitter for increasing uniformity of a generated electromagnetic field (503) distribution in a direction perpendicular to a planar plane and for powering at least one electronic device from the generated electromagnetic field, the method comprising: providing a planar carrier substrate extending along a planar plane, the carrier substrate having a plurality of corners; providing a plurality of carrier substrate extensions extending downwards to the planar plane, the carrier substrate extensions being electrically and mechanically connected to the planar carrier substrate at respective corners of the planar carrier substrate; and forming a transmitter coil comprising at least one coil turn, the at least one coil turn extending on the planar carrier substrate and the carrier substrate extensions.

The techniques described in this disclosure provide the following advantages:

Bending of the corners of the coil changes the mutual inductance to the receiver coil. This limits the sent power to a desired and safe level when located too close to the transmitter; allows to use smaller rated components on the receiver modules instead of using largely-rated components when supporting power transfer at zones with high mutual inductance; reduces the maximum mutual inductance to a fraction of the minimum observed at the immediate surface above the transmitter coil; has a faster decay of the mutual inductance outside of the immediate surface above the transmitter coil. Bending of the corners of the coil can be applied to other operating principles like inductive power transfer, not only to magnetic resonant wireless power transfer. It allows to still have a large enough maximum dimension of the coil in order to have a large enough mutual inductance to a receiver device located away from the transmitter coil.

The mechanical transformation done to achieve bending of the corners can be applied to any coil geometry, not only to rectangular; and can be combined with other methods of magnetic field homogenization like having a coil with variable winding parameters like differing width or spacing of the conductor material or between the turns of the coil.

A substantially planar feature of the transmitter coil allows for such a transmitter coil to be used in substantially planar transmitter devices in which the overall height of the device is restricted.

The fabrication methods are easy to be implemented by using a printed circuit board technology.

The techniques described in this disclosure allow to design a transmitter device that uses a single transmitter coil and a single power amplifier to be used. Such a minimalistic configuration enhances the overall efficiency of the WPT system. Having a single transmitter coil topology being supplied by a single power amplifier topology reduces the system complexity. The applicability of such a device is independent of the transmitter's working principle as well as the set excitation level of the transmitter, meaning that it will allow for interoperability to receiver devices with different output power characteristics as long as the resonance frequencies of the transmitter and receiver is close.

The device is independent of the manufacturing method; therefore, many coil manufacturing methods can be used.

BRIEF DESCRIPTION OF THE DRAWINGS

Further embodiments of the disclosure will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the disclosure. The following detailed description, therefore, is not to be taken in a limiting sense, and the scope of the disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
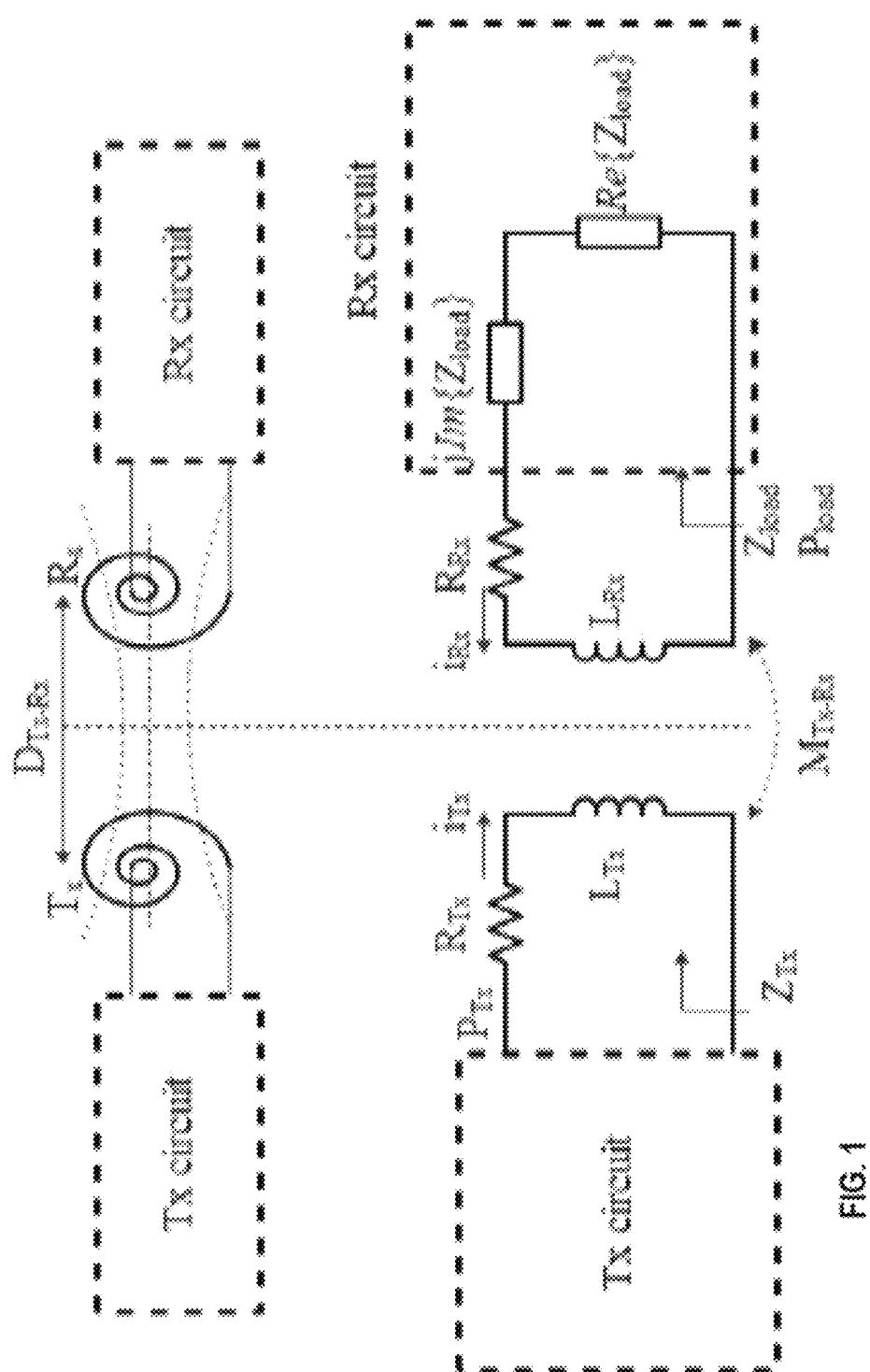
FIG. 1 shows a schematic diagram of a wireless power transfer system.

The techniques described in this disclosure are usable in wireless power transfer systems, in particular in systems with a single transmitter circuit and multiple receiver devices. To illustrate the usefulness of the disclosed solution, a basic model for a 2-coil WPT system is shown in FIG. 1 and serves to obtain an expression for two essential performance metrics, the wireless power link efficiency, $\eta_{Link}$ and the power delivered to the receiver circuit according to its load and coupling conditions to the transmitter.

In actuality, each coil is made up of its desired characteristic, its self-inductance, as well as a few undesirable components that can be grouped into resistive and capacitive components. For the purpose of simplicity, no parasitic capacitors of the transmitter and receiver coils are considered in this model. The lumped parasitic resistances of the inductances $L_{Tx}$ and $L_{Rx}$, which model the losses in their windings, are $R_{Tx}$ and $R_{Rx}$, respectively. The transmitter and receiver coils, separated by an arbitrary distance $D_{Tx-Rx}$ have a mutual inductance of $M_{Tx-Rx}$, which is determined by their geometry, relative position and orientation.

The input impedance of the Rx-circuit is denoted in this figure as $Z_{load}$, which might be composed by a real part and an imaginary part. $Z_{load}$ can represent, for instance, a load connected directly to the receiver resonator or it might arise from a subsequent part of the power conversion chain in the receiver device, for example from a rectifier circuit and a DC-DC converter.

When considering that the wireless power transmission between the transmitter and the receiver resonators happens in the near-field of the transmitter, there are no radiation effects included. Therefore, all the losses in the system occur due to the parasitic resistances of the transmitter and the receiver coils, $R_{TX}$ and $R_{RX}$. In this manner, the power supplied by the transmitter circuit (Tx-circuit) is delivered to the receiver circuit (Rx-circuit) affected by the coils' mutual inductance and it is dissipated as heat in the equivalent series resistances of the coils.

The efficiency on the receiver coil shown in (1) can be defined as the ratio between the power delivered to the load impedance $Z_{load}$, denoted as $P_{load}$ and the total power dissipated in the receiver's coil resistance $R_{RX}$, that is:

$$\eta_{L_{Rx}} = \frac{Re\{Z_{load}\}i_{Rx}^2\big/2}{Re\{Z_{load}\}i_{Rx}^2\big/2 + R_{Rx}i_{Rx}^2\big/2} \tag{1}$$

where, $i_{Rx}$ is the peak current flowing through the loaded receiver coil and $Re\{Z_{load}\}$ is the real part of the load impedance $Z_{load}$. Multiplying both sides of the fraction by the term $\omega L_{Rx}$, where $\omega$ represents the frequency of operation leads to expressing the result as shown in (4), in terms of the quality factor of the receiver coil:

$$Q_{Rx} = \frac{\omega L_{Rx}}{R_{Rx}} \tag{2}$$

and the loaded quality factor of the receiver circuit:

$$Q_L = \frac{\omega L_{Rx}}{Re\{Z_{load}\}} \tag{3}$$

$$\eta_{L_{Rx}} = \frac{Q_{Rx}}{Q_{Rx} + Q_L} \tag{4}$$

The impedance seen by the transmitter, $Z_{TX}$, according to FIG. 1 can be calculated using Kirchhoff's laws including the effect of the mutual inductance, one can calculate this impedance as:

$$\left.\begin{aligned}V_{L_{Tx}} &= (R_{Tx} + j\omega L_{Tx})i_{Tx} + j\omega M_{Tx-Rx}i_{Rx}\\ i_{Rx} &= \frac{-i_{TX}jM_{Tx-Rx}}{R_{Rx} + j\omega L_{Rx} + Z_{load}}\end{aligned}\right\} \Rightarrow\ \Rightarrow \tag{5}$$

$$Z_{Tx} = \frac{V_{L_{Tx}}}{i_{Tx}} = (R_{Tx} + j\omega L_{Tx}) + \underbrace{\frac{\omega^2 M_{Tx-Rx}^2}{R_{Rx} + j\omega L_{Rx} + Z_{load}}}_{Z_{Rx-Tx_{ref}}}$$

where, $i_{Tx}$ is the peak current flowing through the transmitter circuit. It can be observed then from FIGS. 1 and (5), that the input impedance seen by the transmitter circuit, $Z_{TX}$, is a series combination of the $R_{Tx}$ and $L_{Tx}$ and a reflected impedance from the Rx-coil, $Z_{Rx-Tx_{ref}}$, defined in (5). The Tx-coil efficiency is the power delivered to the real part of the reflected impedance, $Re\{Z_{Rx-TX_{ref}}\}$, the power transfer to the Rx coil, divided by the total power dissipated in $R_{Tx}$ and $Re\{Z_{Rx-Tx_{ref}}\}$, that is:

$$\eta_{L_{Tx}} = \frac{Re\{Z_{Rx-Tx_{ref}}\}i_{Tx}^2\big/2}{Re\{Z_{Rx-Tx_{ref}}\}i_{Tx}^2\big/2 + R_{Tx}i_{Tx}^2\big/2} \tag{6}$$

The maximum Tx-coil efficiency is obtained when real part of the reflected impedance is maximized, that is when the imaginary part of $j\omega L_{Rx} + Z_{Rx-Tx_{ref}}$ is equal to zero, which indicates that the Rx-coil is at resonance. In the case of a resonant Rx-coil, an expression for this reflected resistance can be proven to be:

$$Z_{Rx-Tx_{ref}} = \frac{\omega^2 k_{Tx-Rx}^2 L_{Tx}L_{Rx}}{R_{Rx} + j\omega L_{Rx} + j\,Im\{Z_{load}\} + Re\{Z_{load}\}} \Rightarrow\ \Rightarrow \tag{7}$$

-continued $$Z_{Rx-Tx_{ref}} = Re\{Z_{Rx-Tx_{ref}}\} = R_{Rx-Tx_{ref}} = \frac{\omega^2 k_{Tx-Rx}^2 L_{Tx}L_{Rx}}{R_{Rx} + Re\{Z_{load}\}}$$

Using equations (2) and (3) and defining the Tx-coil quality factor as:

$$Q_{Tx} = \frac{\omega L_{Tx}}{R_{Tx}}, \tag{8}$$

the reflected resistances to the transmitter given in (7) can be rewritten in terms of those quality factors as follows:

$$\begin{aligned}Re\{Z_{Rx-Tx_{ref}}\} &= R_{Rx-Tx_{ref}} \tag{9}\\ &= k_{Tx-Rx}^2 Q_{Tx}\frac{\dfrac{Q_{Rx-L}}{Q_{Rx}Q_L}}{Q_L + Q_{Rx}}R_{Tx}\\ &= k_{Tx-Rx}^2 Q_{Tx}Q_{Rx-L}R_{Tx}\end{aligned}$$

where $Q_{Rx-L}$ was defined as:

$$Q_{Rx-L} = \frac{Q_{Rx}Q_L}{Q_{Rx} + Q_L} = \frac{\omega L_{Rx}}{R_{Rx} + Re\{Z_{load}\}} \tag{10}$$

Considering the reflected impedance and assuming a series resonant Rx-circuit, the resulting Tx-coil efficiency can be rewritten from (6) and (9) as:

$$\eta_{L_{Tx}} = \frac{R_{Rx-Tx_{ref}}}{R_{Rx-Tx_{ref}} + R_{Tx}} = \frac{k_{Tx-Rx}^2 Q_{Tx}Q_{Rx-L}}{k_{Tx-Rx}^2 Q_{Tx}Q_{Rx-L} + 1} \tag{11}$$

Finally, the total efficiency of the wireless power transfer link shown in FIG. 1 is:

$$\eta_{Link} = \frac{Q_{Rx-L}}{Q_L} + \frac{k_{Tx-Rx}^2 Q_{Tx}Q_{Rx-L}}{k_{Tx-Rx}^2 Q_{Tx}Q_{Rx-L} + 1} \tag{12}$$

From (12) one can immediately observe that the link efficiency increases whenever, the coupling factor between and the quality factor of the associated coils increases. The power delivered to the overall receiver circuit can be calculated from the link efficiency as:

$$P_{Load} = \eta_{Link}P_{Tx} \tag{13}$$

The power at the transmitter side, $P_{Tx}$ is dependent on the type of circuit. In general, there are four types of transmitter circuit, a voltage source and a series resonant Tx, a voltage source and a parallel resonant Tx, a current source and a series resonant Tx, and, a current source and parallel resonant Tx. From a sinusoidal voltage source with a peak value of $V_S$ and a series resonant circuit at the transmitter side, i.e., $1/(C_{Tx}\omega) = \omega L_{TX}$ the power delivered to the receiver circuit is:

$$P_{Tx} = \frac{V_S^2/2}{R_{TX} + R_{Rx-Tx_{ref}}} \Big\} \Rightarrow P_{Tx} = \frac{V_S^2/2}{R_{Tx}\left(k_{Tx-Rx}^2 Q_{Tx}Q_{Rx-L} + 1\right)} \Big\} \Rightarrow \quad (14)$$

$$P_{Load} = \eta_{Link}P_{Tx} = \frac{V_S^2}{2R_{Tx}} \frac{Q_{Rx-L}}{Q_L} \frac{k_{Tx-Rx}^2 Q_{Tx}Q_{Rx-L}}{\left(k_{Tx-Rx}^2 Q_{Tx}Q_{Rx-L} + 1\right)^2} \quad 5$$

With a current source with a magnitude $I_S$ and a series resonant Tx, the power delivered to the receiver can be found by: 10

$$P_{Tx} = \frac{I_S^2}{2}\left(R_{Tx} + R_{Rx-Tx_{ref}}\right) \Big\} \Rightarrow \Rightarrow \quad (15)$$

$$P_{Tx} = \frac{I_S^2}{2}R_{Tx}\left(k_{Tx-Rx}^2 Q_{Tx}Q_{Rx-L} + 1\right) \Big\} \Rightarrow \Rightarrow$$

$$P_{Load} = \eta_{Link}P_{Tx} = \frac{I_S^2}{2}R_{Tx}\frac{Q_{Rx-L}}{Q_L}k_{Tx-Rx}^2 Q_{Tx}Q_{Rx-L}$$

from where we can immediately observe that if the current source exciting the transmitter circuit is kept at a constant level and the receiver device got closer to the transmitter, i.e., increased its coupling factor, the power delivered to receiver also increased.

Figure 2A:
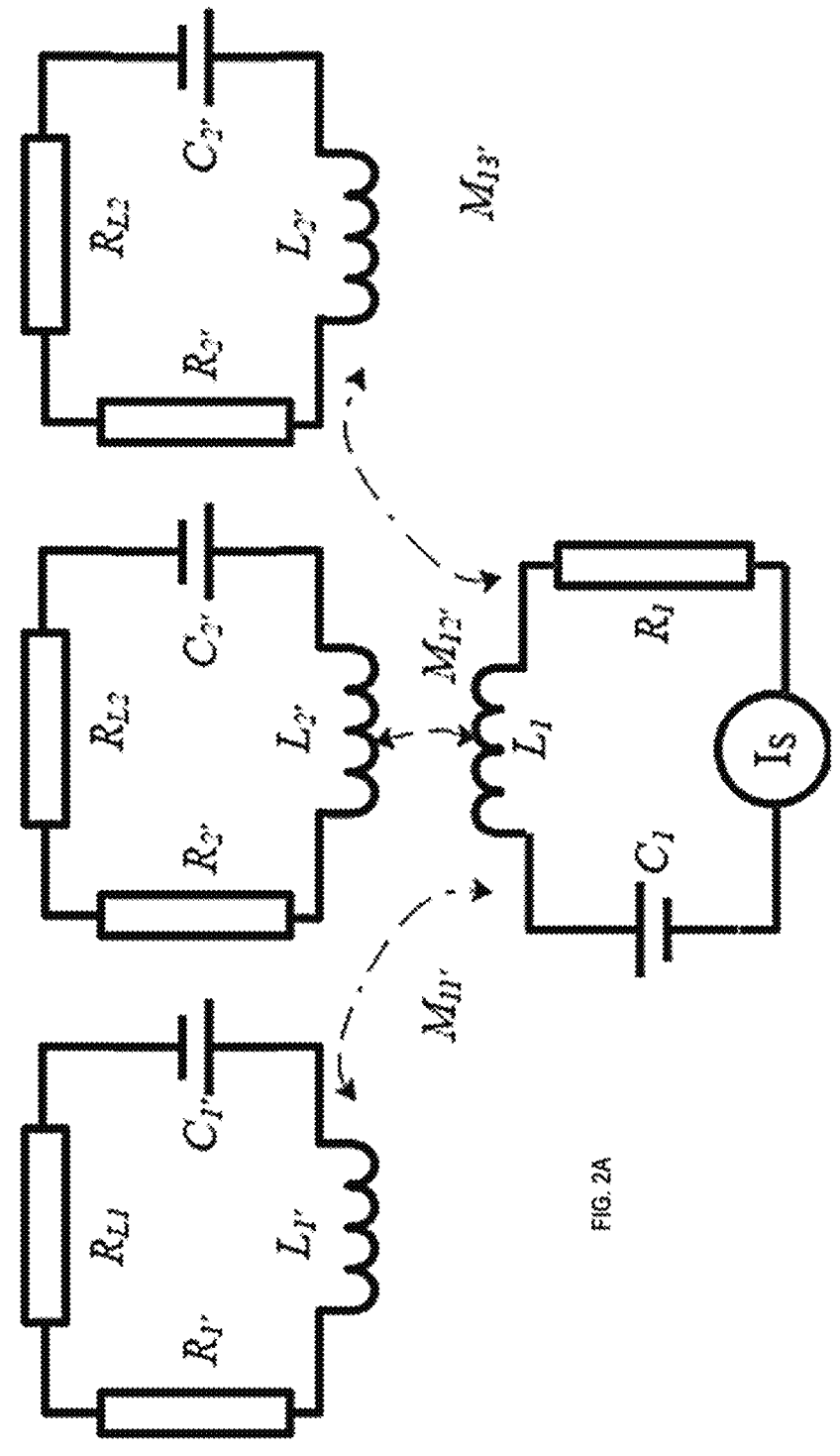
FIGS. 2A and 2B show circuit diagrams of a one-to-many wireless power transfer system.
Figure 2B:
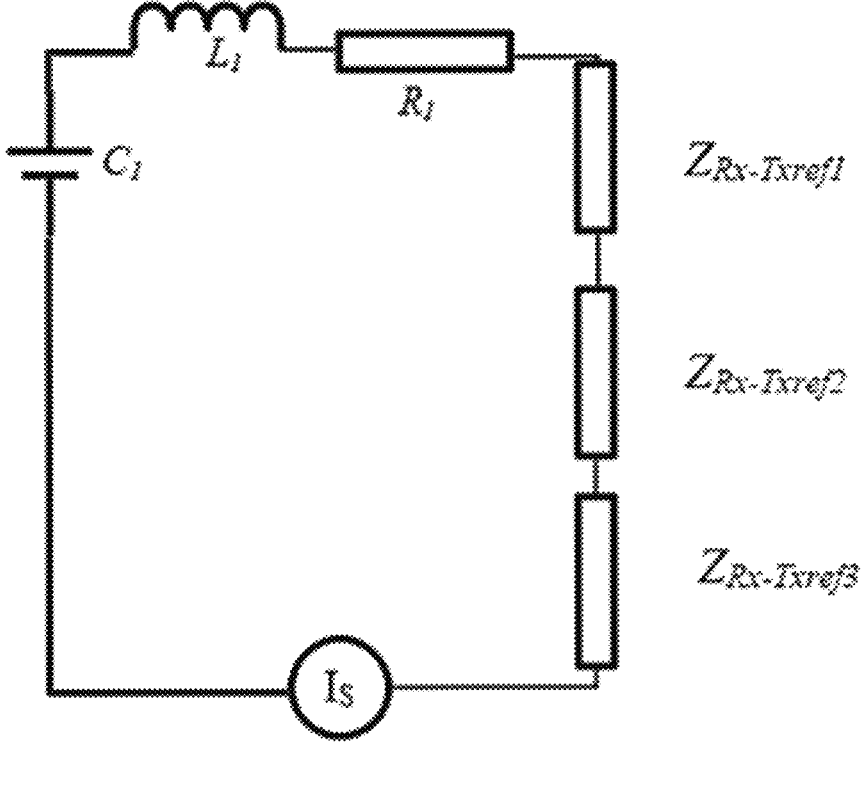

FIGS. 2A-2B show a one-to-many WPT system. FIG. 2A shows the transmitter circuit being excited by a current source and coupled to three independent receiver circuits via the mutual inductances $M_{11'}$, $M_{12'}$, and $M_{13'}$ each loaded with a certain load denoted as $R_{L1}$, $R_{L2}$, $R_{13}$. FIG. 2B shows a simplified version of the WPT system in FIG. 2A, in which the receiver circuits have been reflected back to the transmitter. This one-to-many system works with a current source with a certain amplitude $I_S$, whose value is large enough to provide usable wireless power to receivers with a reduced mutual inductance. However, this current level might be too high for receivers located close with an increased mutual inductance and even incur damage to the receivers. This could be fixed by applying an emergency shutdown on the receiver side in case the mutual inductance rises beyond a certain threshold, however, this will limit the volume in space in which the transmitter can support receivers.

In one-to-one systems this is not an issue because if the receiver is too close, the transmitter can lower the current level to not damage the receiver. In one-to-many systems the transmitter cannot lower the current level to a safe value for the receiver device with an increased mutual inductance because it will leave the receiver device with a reduced mutual inductance with very reduced or even without any wireless power delivered. This problematic calls for the use of high-rated components on the receiver side which might be difficult to fit inside receiver devices which are substantially planar, for example, some consumer electronic devices like smartphones and wearables.

The solution presented in this disclosure is applicable to wireless power receiver devices like smartphones, wearables like smartwatches, fitness bands, virtual reality headsets and hand-controllers, over-ear headphones, tablets, portable computers, smart glasses, gaming controllers, desktop accessories like a mouse or keyboard, battery banks, remote controls, hand-held terminals, e-mobility devices, portable gaming consoles, portable music players, key fobs, drones used in wireless power transfer systems that allow a high-degree of freedom of the receiver.

Figure 3:
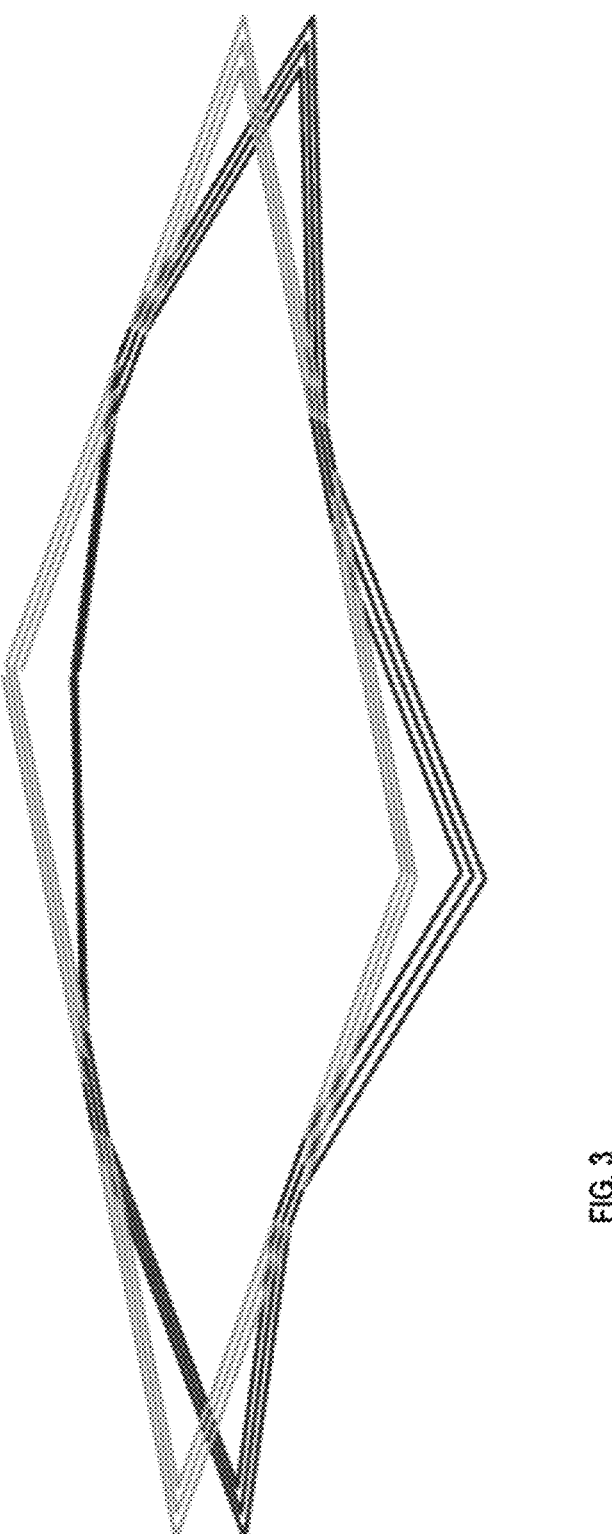
FIG. 3 shows a wireless power transmitter 301 that is completely extending on a planar plane and a wireless power transmitter 400 according to the disclosure which is partially extending on the planar plane.

FIG. 3 shows a wireless power transmitter 301 that is completely extending on a planar plane and a wireless power transmitter 400 according to the disclosure which is partially extending on the planar plane. As can be seen from FIG. 3, the coil of the wireless power transmitter 301 extends onto an area and the coil of wireless power transmitter 400 according to the disclosure extends into a volume.

Figure 4:
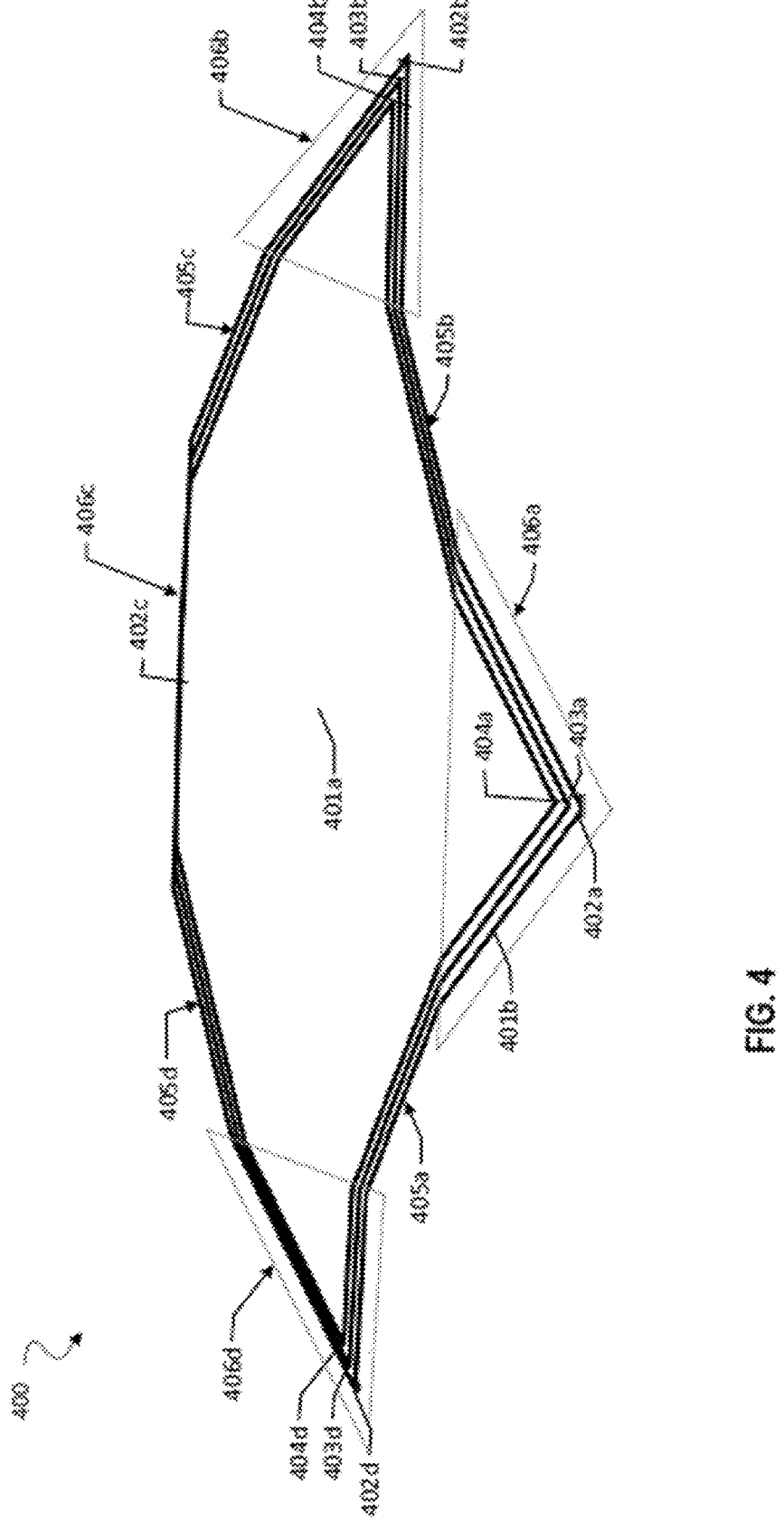
FIG. 4 shows a wireless power transmitter 400 according to the disclosure.

FIG. 4 shows the 3-dimensional transmitter coil 400 according to the disclosure having a main coil plane 401a. The coil has a certain number of turns 401b, which in the case of this figure is three but the number of turns could be different.

This image shows a square coil but the coil geometry could be different. Due to the geometry of the coil, each turn has four vertices, for the number of turns illustrated in this figure, the most outer turn has 402a-402d vertices, the middle turn has 403a-403d vertices and the most inner turn has 404a-404d vertices. The principal characteristic of the coil of this disclosure is that at least the four vertices composing a single turn are displaced with a certain negative or positive height relative to the main coil plain 401a. This image shows how all the vertices of each turn are displaced. Displacing the vertices of the turns of this coil has left sections 405a-405d of the turns at the same height as the main plane 401a of the coil 400.

FIG. 4 exemplifies the vertices displacement for a transmitter coil 400 with four sides. A transmitter coil with more sides, for example five, will have turns with five vertices, and the turns of a hexagonal transmitter coil 400 will have six. A similar statement can be said for transmitter coils with a greater number of sides, for example N. In such a case, at least the N number of vertices composing a single turn are displaced with a certain negative height relative to the main coil plain 401a.

A displacement of the turns' vertices in the negative direction relative to the main coil plane 401a has been depicted in FIG. 4. Note that the displacement can also have been done in the positive direction relative to the main plane 401a.

Figure 5:
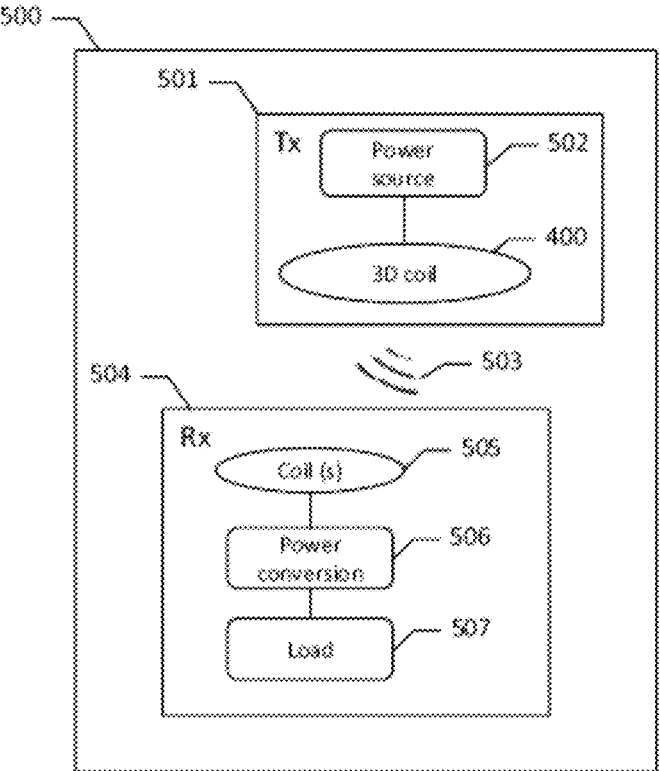
FIG. 5 shows a schematic diagram illustrating a wireless power transfer system 500 according to the disclosure.

FIG. 5 shows a wireless power transfer system 500 that implements the disclosed coil geometry. The system comprises a wireless power transmitter device 501 and at least one wireless power receiver device 504. The wireless power transmitter device comprises a power source 502, at least one coil 400 of the disclosed geometry forming a resonant circuit in conjunction with an external capacitance as exemplified in FIG. 1. The wireless power transmitter device is operated to produce a closed electrical circuit for electrons to flow through and to generates an electromagnetic field 503 that emanates from the transmitter device; wherein the wireless power transmitter device 501 is operated to wirelessly power or charge electric or electronic device(s) 504 by providing the produced electromagnetic field at a receiver coil or coil array 505 to convert the received electromagnetic field into electrical energy by the use of a power conversion module 506 and provide the converted power to a load 507.

The wireless power transmitter 501 increases uniformity of the generated electromagnetic field 503 distribution in a direction perpendicular to the planar plane 401a shown in FIG. 4. The wireless power transmitter 501 can be used for powering at least one electronic device 507 from the generated electromagnetic field 503.

Such a wireless power transmitter 501 comprises a transmitter coil 400, e.g., as shown in FIG. 4, 10, 11 or 12. The transmitter coil 400 comprises at least one coil turn 401b for generating an electromagnetic field 503.

As shown in FIG. 4, at least one coil turn of the transmitter coil 400 extends along a plurality of first linear sections 405a, 405b, 405c, 405d and a plurality of second linear sections 406a, 406b, 406c, 406d which are electrically connected with each other.

The first linear sections 405a, 405b, 405c, 405d are arranged to enclose a planar plane 401a of the transmitter coil 400 as can be seen from FIG. 4. The second linear sections 406a, 406b, 406c, 406d are formed to extend angularly to the planar plane 401a as can also be seen from FIG. 4.

The first linear sections 405a, 405b, 405c, 405d may be arranged alternately with every two contiguous second linear sections 406a, 406b, 406c, 406d as shown in FIG. 4.

The at least one coil turn of the transmitter coil 400 may form a polygonal geometric figure whose corners are bent angularly to the planar plane 401a as illustrated in FIG. 4.

The corners of the polygonal geometric figure may be bent to the planar plane 401a under a positive angle or a negative angle. FIG. 4 shows a negative angle.

Figures 9A, 9B, 9C, 9D:
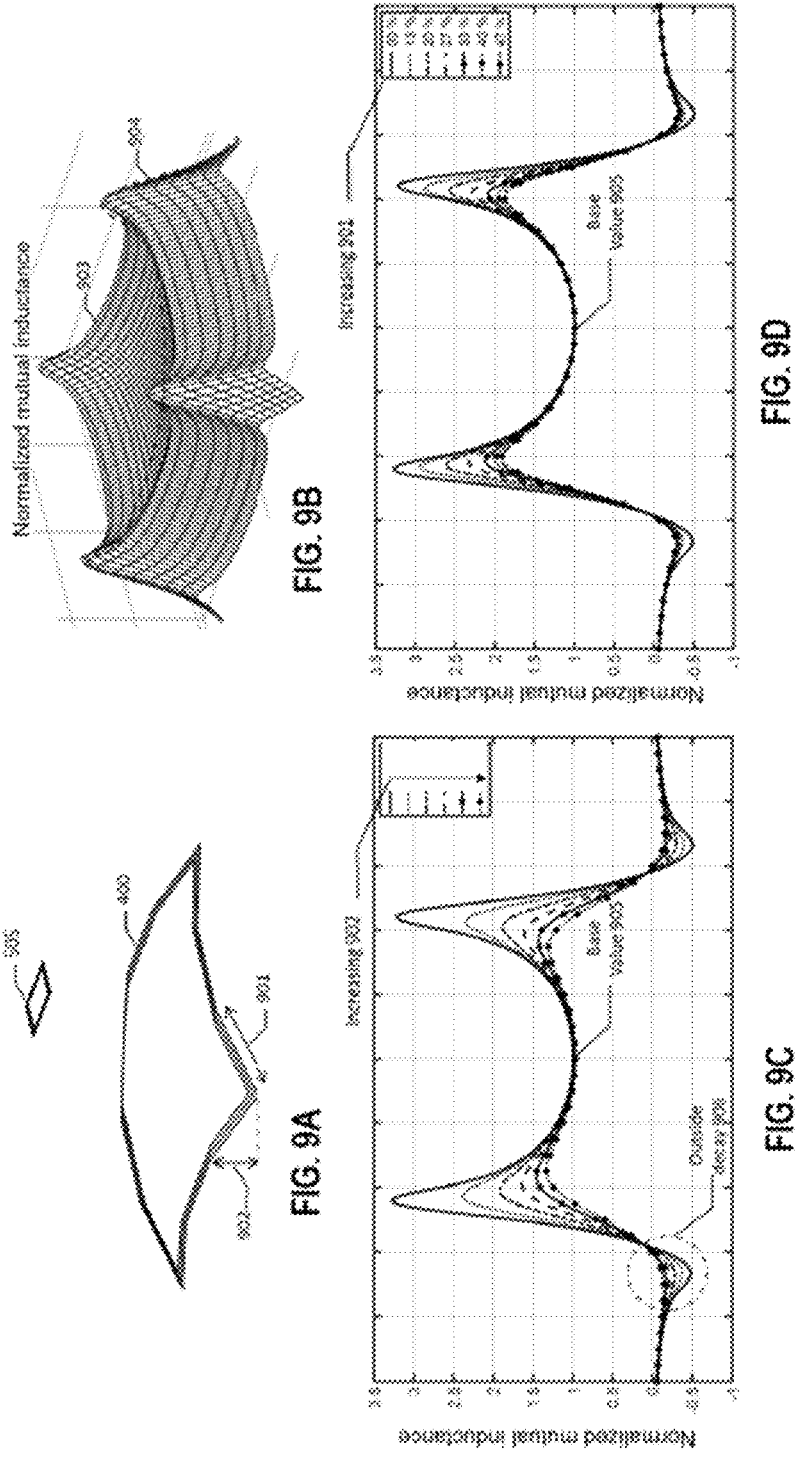
FIGS. 9A, 9B, 9C and 9D show performance diagrams illustrating the performance of the coil of the wireless power transmitter 400 shown in FIG. 4.
Figure 10:
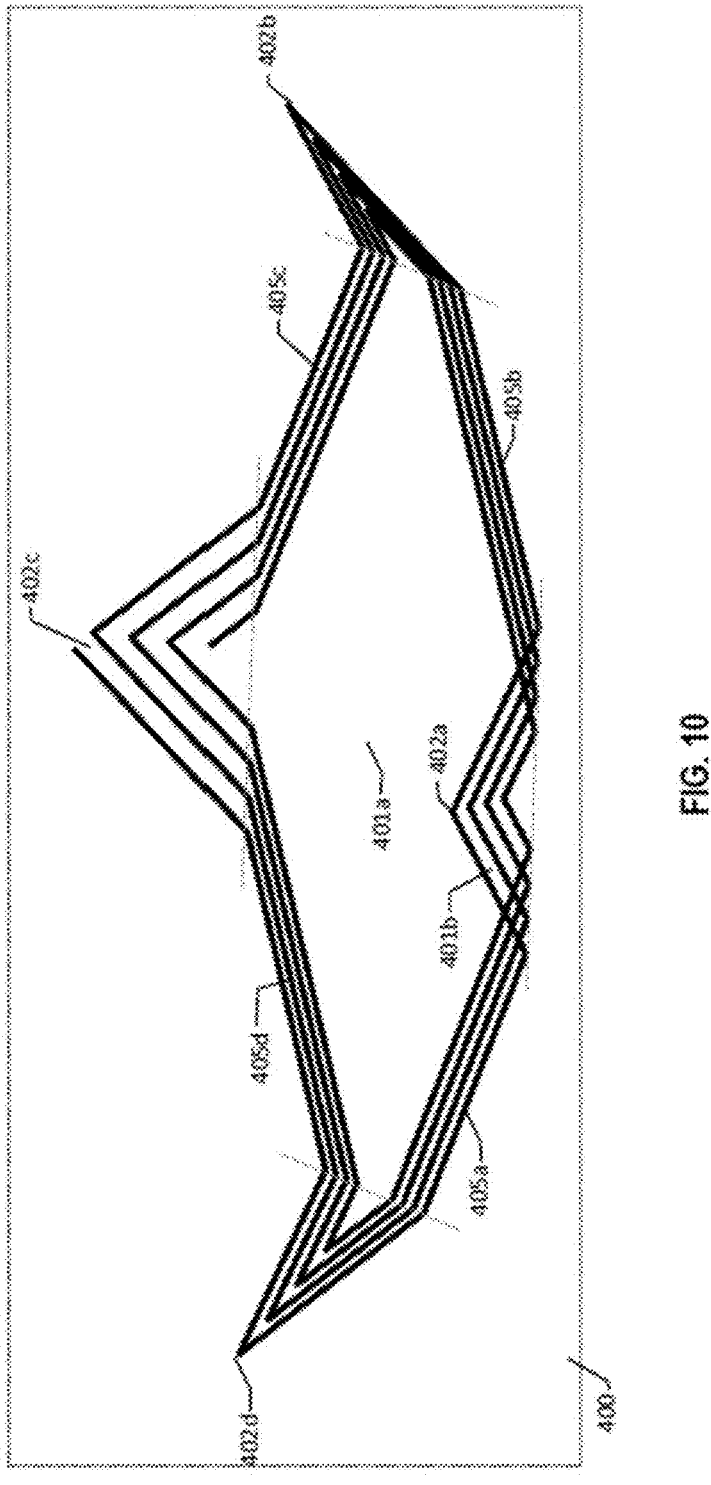
FIG. 10 shows a schematic diagram illustrating another exemplary implementation of the coil of the wireless power transmitter 400 shown in FIG. 4.

The corners of the polygonal geometric figure may be bent to the planar plane 401a at same height 902 or at same depth 901, as exemplarily shown in FIG. 9A.

The corners of the polygonal geometric figure may be bent away from the planar plane 401a according to a predetermined slope profile.

Figure 11:
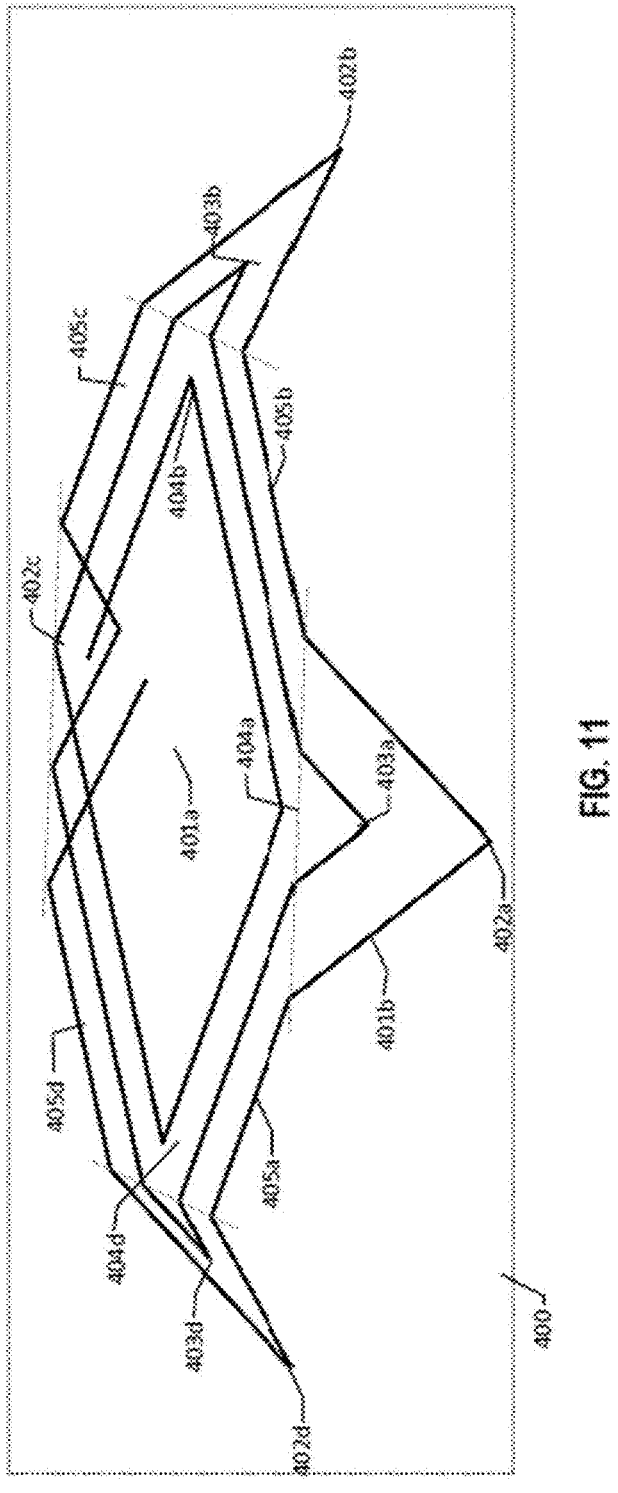
FIG. 11 shows a schematic diagram illustrating a further exemplary implementation of the coil of the wireless power transmitter 400 shown in FIG. 4.

As exemplarily shown in FIG. 11, at least one second coil turn of the transmitter coil 400 may extend completely along the planar plane 401a without a displacement from the planar plane 401a.

The at least one second coil turn of the transmitter coil 400 may be an inner coil turn with respect to the at least one coil turn of the transmitter coil 400.

Figure 12:
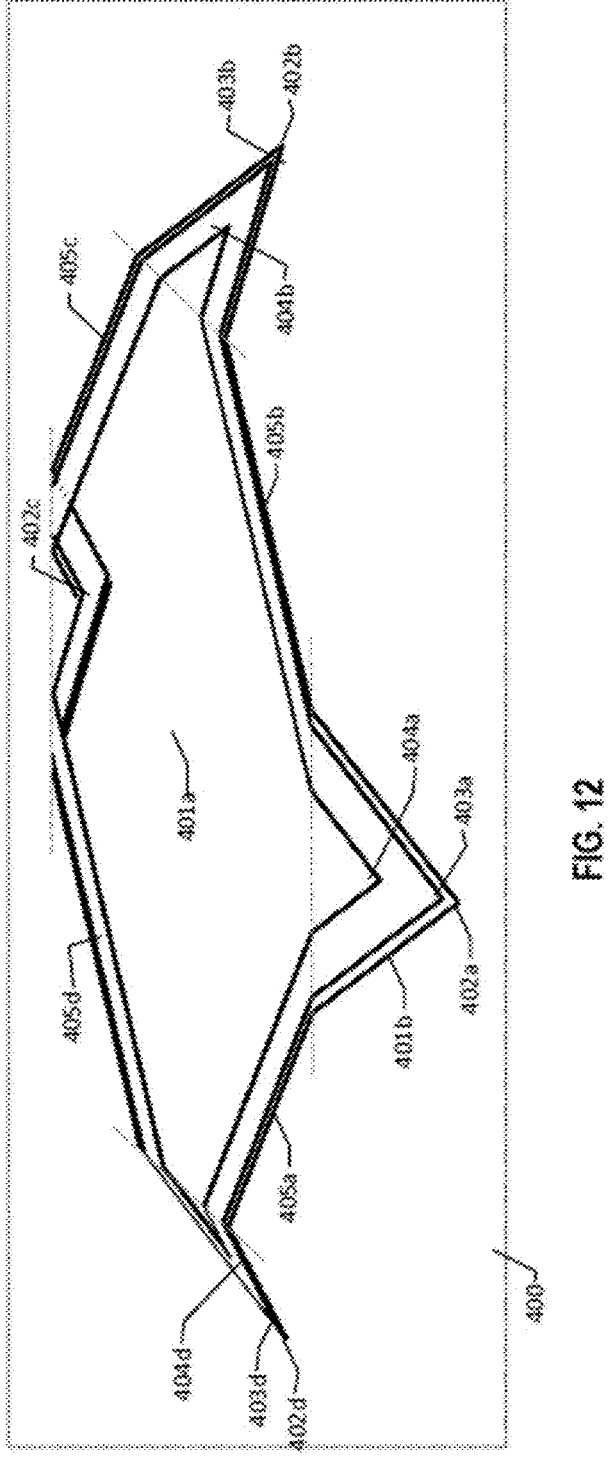
FIG. 12 shows a schematic diagram illustrating a further exemplary implementation of the coil of the wireless power transmitter 400 shown in FIG. 4.

The coil turns of the at least one coil turn 401b of the transmitter coil 400 may have a different spacing and/or a different conductor width with respect to each other, e.g., as shown in FIG. 12.

Figures 7A, 7B, 7C:
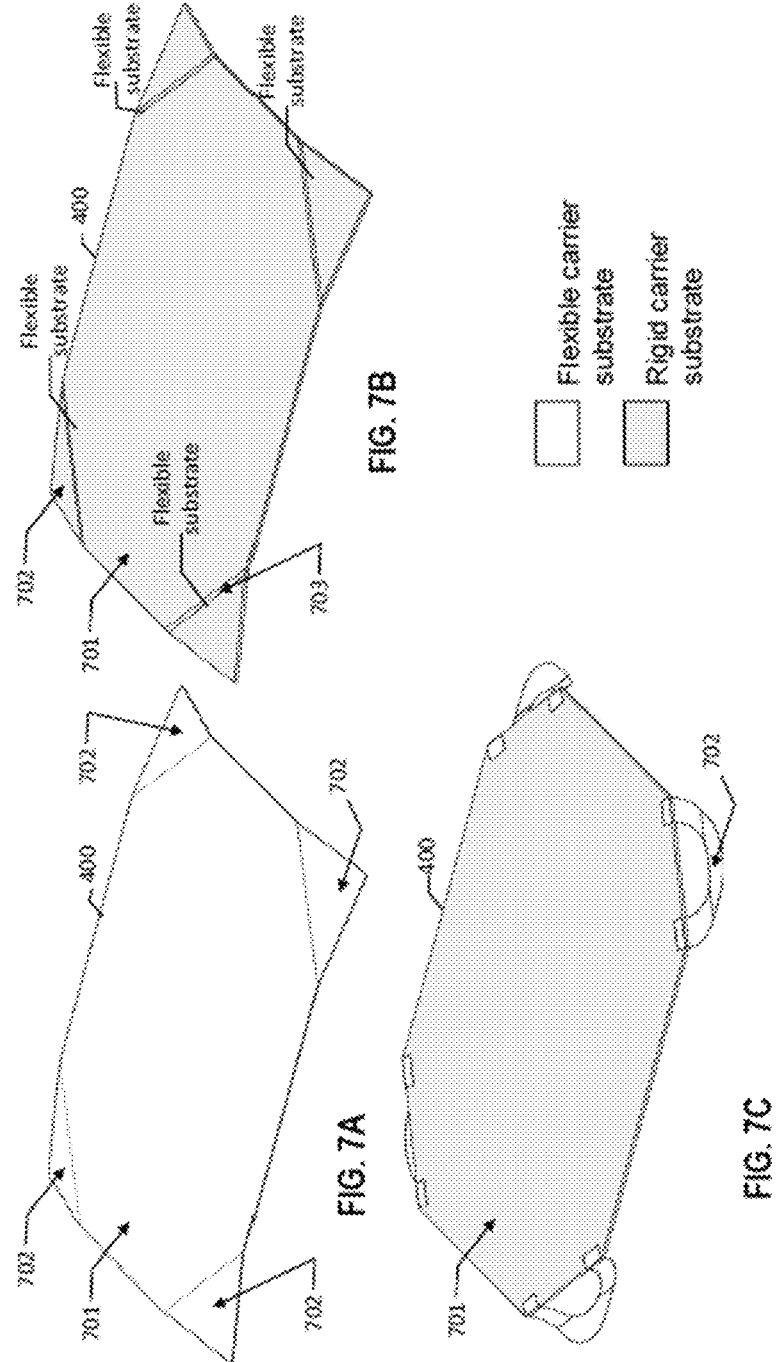
FIGS. 7A, 7B and 7C show schematic diagrams illustrating exemplary implementations of a coil of the wireless power transmitter 400 shown in FIG. 4.

The wireless power transmitter 501 may comprise: a planar carrier substrate 701, e.g., as shown in FIGS. 7A-7C, extending along the planar plane 401a. The planar carrier substrate 701 can carry the plurality of first linear sections 405a, 405b, 405c, 405d of the at least one coil turn of the transmitter coil 400 as shown in FIG. 4. The wireless power transmitter 501 may comprise: a plurality of carrier substrate extensions 702, as shown in FIGS. 7A-7C. The carrier substrate extensions are carrying the plurality of second linear sections 406a, 406b, 406c, 406d of the at least one coil turn of the transmitter coil.

The planar carrier substrate 701 may comprise a plurality of corners at which the carrier substrate extensions 702 are electrically and mechanically connected to the planar carrier substrate 701, e.g., as shown in FIGS. 7A-7C.

The carrier substrate extensions 702 may be formed from the plurality of corners of the planar carrier substrate 701 which are bent to the planar plane 401a, e.g., as shown in FIG. 7A.

Alternatively, the carrier substrate extensions 702 may be formed from rigid carrier substrates which are connected via respective flexible carrier substrates to the planar carrier substrate 701, e.g., as shown in FIG. 7B.

Alternatively, the carrier substrate extensions 702 may be formed from flexible carrier substrates which are connected to the planar carrier substrate 701, e.g., as shown in FIG. 7C.

Alternatively, the carrier substrate extensions 702 may be formed from rigid carrier substrates which are connected via respective connection modules to the planar carrier substrate 701, e.g., as shown in FIGS. 8A, 8B, 8C, 8D.

These respective connection modules may comprise at least one of the following: a third substrate with electrically conductive tracks, an array of conductive elements, a pin header, a combination of a male and a female pin header for electrically connecting the first linear sections 405a, 405b, 405c, 405d on the planar carrier substrate 701 with the second linear sections 406a, 406b, 406c, 406d on the carrier substrate extensions 702.

The coil turns 401b of the transmitter coil 400 can be angular. Corners of the coil turns 401b can be angular or rounded.

Figure 6:
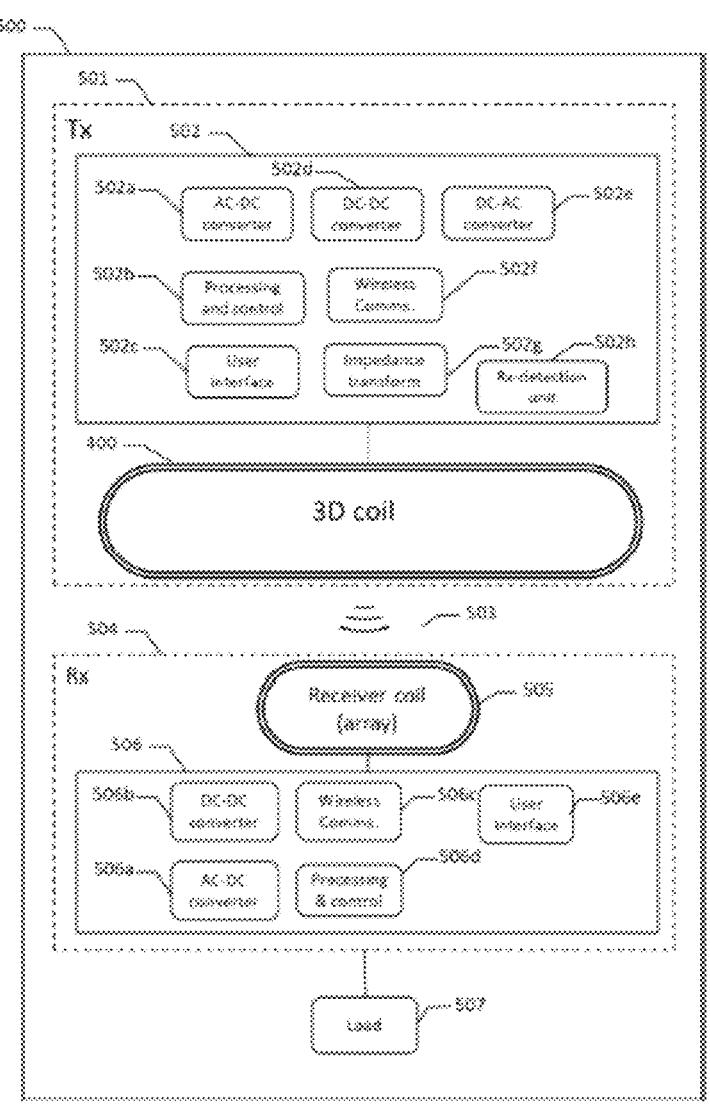
FIG. 6 shows a schematic diagram illustrating another implementation of the wireless power transfer system 500 shown in FIG. 5.

FIG. 6 shows another possible implementation of the wireless power transfer system of FIG. 5. The wireless power supply comprises, the AC power source 502e of the transmitter device 501. This power source may be connected to the output of a DC-DC converter 502d, in order to extract the required power for its function from a DC power source, such as a battery in the transmitter device. In some other implementations the transmitter device may also have the possibility to extract the required power for its function from an AC-DC converter 502a, such as a circuit that converts the AC power of the line into a DC power. The transmitter device may also include an impedance transformation circuit 502g that is capable of transforming the output impedance of the DC-AC converter 502e from one value to another value. Such a transformation unit is useful for impedance matching in order to transfer optimum power to the receive device.

The wireless power transmitter 501 could be capable of adjusting the wireless power transfer by the use of the processing control unit 502b, for example, by operating it to change the characteristics of the output of the DC-AC converter 502e that changes the magnitude (or phase) of the excitation. Although this is a possibility, the benefits of being able to work with a constant current source have been discussed before. Note however, that such a magnitude control could be useful when the transmitter is supplying to a single receiver device exclusively. Performing a change in the magnitude of the excitation will change the characteristics of the electromagnetic field 503 that emanates from the 3-dimensional coil. These possible changes can be achieved with the use of a receiver detection unit 502h that is directly affected by a possible change in the coupling conditions of the at least one receiver 504 with respect to the transmitter 501. For example, when a receiver device is moved from a previous to a new location, because of the electromagnetic coupling 503 that exists between the receiver coil or coil array 505 and the transmitter coil 400, there will be a change reflected on the transmitter coil, same that is represented by (9). In this figure, the receiver detection unit could be implemented with a bi-directional coupler connected as a reflectometer and that in turn is connected to an RF detector circuit. The receiver detection unit may be comprised by other voltage/current/impedance/power sensitive circuit that will be directly affected by (9) for a changing coupling condition of the receiver(s). Note that even when the receiver device 400 did not undergo a change in position or orientation, (9) can still be affected when a change in the load of the receiver device is present. This could be, for example, a change in the charging status of a battery attached to the device 507.

The processing characteristic of the processing and control unit of the transmitter device 502b could be accomplished by implementing a central processing unit, a microcomputer or a microcontroller in charge of sampling and processing the analogue voltage coming out of the receiver detection unit 502h to effectively operate the DC-AC converter 502e or the DC-DC converter 502d that sets the operating conditions of the AC source that excites the transmitter coil.

The processing and control unit 502b could also be affected by the information coming from a possible wireless communication unit 502f in the transmitter device 501 which is capable to wirelessly communicate to the wireless communication unit 506c in the receiver device 504 through electromagnetic waves. The two wireless communication units may exchange information via two distinct transducers compatible with, but not limited to, Bluetooth, Bluetooth Low Energy (BLE), ZigBee, WiFi, wireless local area network (WLAN), Thread, cellular communications like $2^{nd}$ generation (2G)/$3^{rd}$ generation (3G)/$4^{th}$ generation (4G)/$5^{th}$ generation (5G)/Long-Term Evolution (LTE), narrowband internet of things (NB-IoT), near-field communication (NFC), radio-frequency identification (RFID), WirelessHART, among others. On the receiver device 504, the wireless communication unit 506c may aid in controlling a charging circuit 506 via another data processing and control unit 506d that may be present in the receiver device 504. There could be a script running inside 506d capable of gathering the relevant information related to the coupling conditions of the receiver(s) and other information like the level of the charge of the battery in the receiver device.

The receiver device 504 could have a single coil or an arrangement of coils 505 acting as the inductive element(s) of an inductive-capacitive resonator(s). In some implementations, the receiver device 504 may be connected to an AC-DC converter 506a, for example a rectifier that converts the AC to a DC if the device to be powered by the specific application requires DC, such as the case of delivering DC power to an electronic device. In some other implementations, there could be a circuit 506b to convert a DC power level to another DC power level, such as a DC-DC converter or a charging circuit used to regulate the power delivered to the load 507 which might also be a battery of the electronic device 504 that is being supplied to or even a voltage regulator that ensures a certain voltage level at the input of the electronic device.

Both the transmitter and receiver device might include a user interface 502c and 506e to help the user of the devices know that the power transfer is commencing or taking place as well as any other possible fault operating state.

FIGS. 7A-7C show a possible implementation of coil 400. Note that in this image the turns of the coil are not visible for simplicity. The tuns of the coil are considered to be on a carrier substrate that could be flexible or a combination of flexible and rigid substrates. FIG. 7A shows a flexible carrier substrate, that due to its flexible nature, the corners of the coil can be bent in a straight forward manner.

FIG. 7B shows an assembly of a main rigid substrate carrying the sections of the turns found on the main plain of the coil 401a to four connecting flexible substrates that allow to change the height of the vertices of the turns. Each flexible substrate is electrically connected to the main rigid substrate on one end and to another rigid substrate on the other end. Note that the number of flexible substrates connecting the inner and outer rigid substrate will depend on the number of sides of the coil. i.e., a pentagonal coil will require 5 flexible substrates and a hexagonal coil will require 6.

FIG. 7C shows another possible implementation of the coil 400. In this case the four flexible substrates are electrically connected to the sections of the turns found on the main substrate while also being displaced in height.

In order for the flexible substrates to retain their shape, they could be affixed to the shell containing the transmitter coil 400.

The required electrical connections between the sections of the turns found on the rigid and flexible substrates of FIGS. 7B to 7C could be achieved by soldering, by ensuring an electrical contact by pressure or by gluing them with a conductive glue.

Figure 8A:
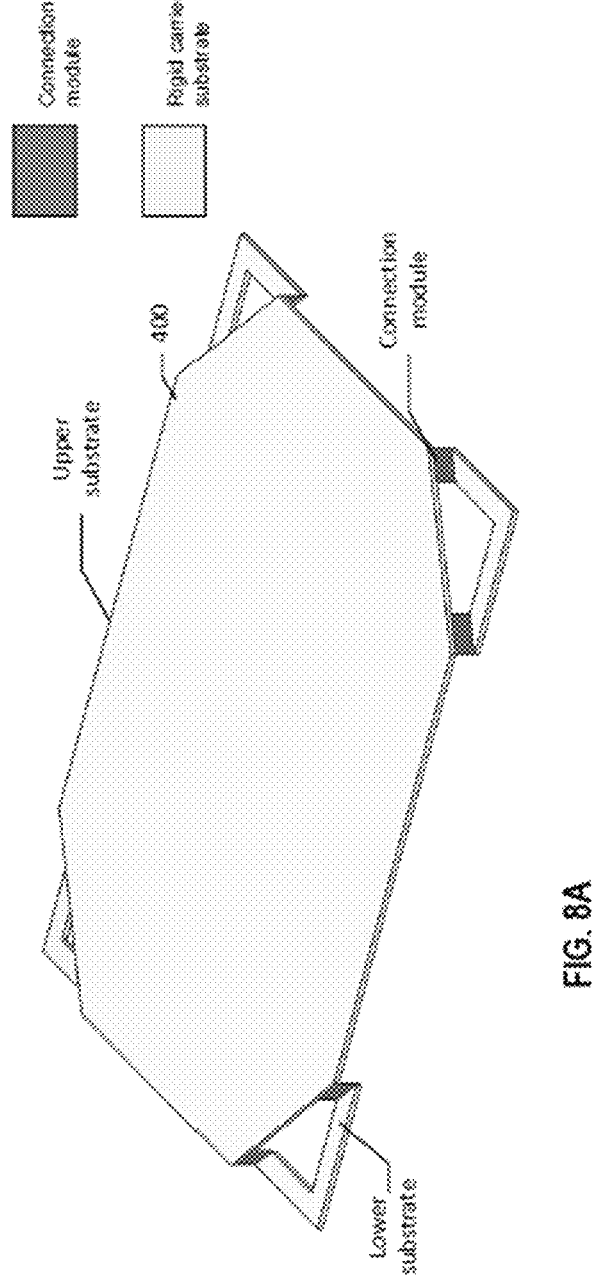
FIGS. 8A, 8B, 8C and 8D show schematic diagrams illustrating further exemplary implementations of the coil of the wireless power transmitter 400 shown in FIG. 4.

FIGS. 8A-8D show another possible implementation of the coil 400 in which the usage of a flexible substrate is avoided, thus providing more mechanical stability. FIG. 8A shows that the main plane of the coil containing part of the turns is implemented with a rigid substrate, denoted as "upper substrate" in this figure. The remaining sections of the turns are implemented by 4 lower substrates. All substrates are made of a rigid material. In order to perform an electrical connection between the sections of the turns on the upper and the four lower substrates, this embodiment employs a connection module.

Figure 8C:
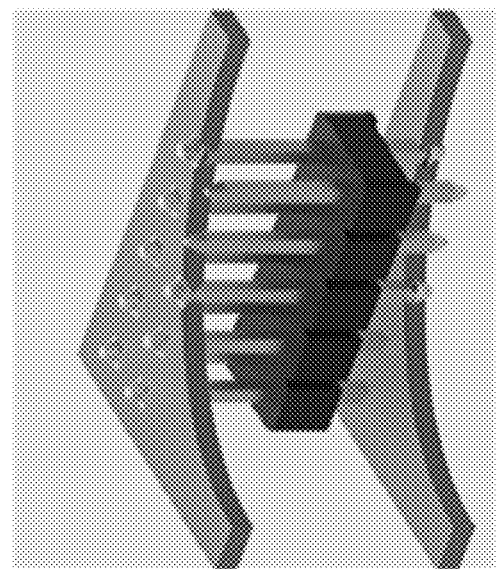
Figure 8D:
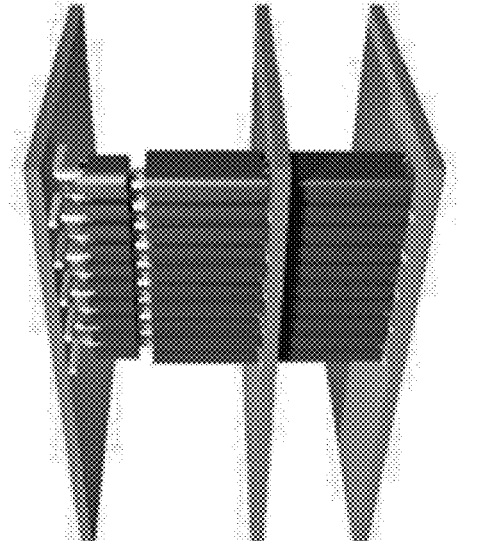
Figure 8B:
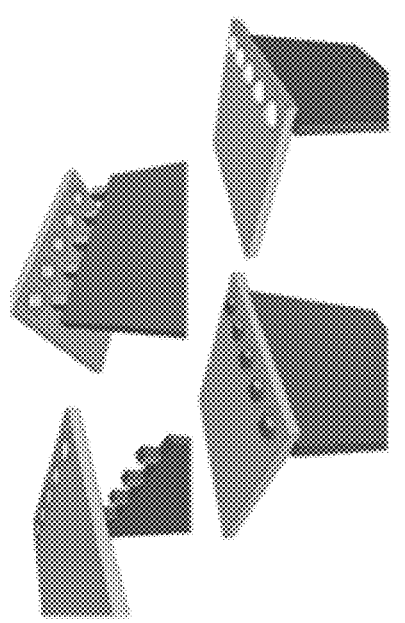

Possible implementations of the connection module are given in FIGS. 8B to 8D as an example. FIG. 8B shows that a third substrate with electrically conductive tracks can be soldered, pressed or glued, as explained above to the upper and lower substrates. FIG. 8C shows that an array of conductive elements, such as a pin header can be soldered, pressed or glued as explained above to the upper and lower substrates. FIG. 8D shows that a combination of a female and male pin headers can also be employed to perform the electrical connections. Note that all the vertices of the turns found on the lower substrates of FIG. 8A have the same height, while the vertices of the turns on FIGS. 7A-7B have a different height.

FIGS. 9A-9D demonstrate the advantageous effect that the disclosed coil 400 has. FIG. 9A shows a transmitter coil 400 of the transmitter device 501 and a receiver coil 505 of a receiver device 504. The receiver coil 505 is located parallel to the transmitter coil main plane 401a at a short axial separation. FIG. 9A also shows two design variables of this coil. The design variable 902 denotes the height difference between the main plane of 401a and the vertices of the most-outer turn. The design variable 901 shows the percentage of the coil's side length that has been displaced in height with respect to the percentage of the coils side length that has remained in the main plane 401a.

FIG. 9B depicts a surface plot 903 of the normalized mutual inductance between the exemplary pair of coils of FIG. 9A when the receiver coil is scanned above the transmitter coil at a certain height. Note the spatial peaks of the mutual inductance formed when the receiver coil is very well aligned to the transmitter coil when scanning the area near the corners. This figure also shows a dashed line 904 along the diagonal of the surface plot useful to observe the normalized mutual inductances illustrated in FIGS. 9C, 9D.

FIG. 9C shows the normalized mutual inductance between the exemplary pair of transmitter and receiver coils of FIG. 9A when the receiver is positioned on top of the diagonal scan 904 of FIG. 9B. The several charts on this figure represent the reduction of the maximum mutual inductance that can be achieved for an increasing design variable 902. Note that although the maximum mutual inductance has been decreased, the base value 905, which corresponds to the value observed when the receiver coil is on the center of the transmitter coil main plain 401a, has been maintained. FIG. 9C also shows that a reduced decay of the mutual inductance is observed outside of the transmitter coil's surface. Such a behavior is desirable if the system is intended to be well-coupled only at the surface of the transmitter coil when the receiver device is very close to the transmitter device.

FIG. 9D shows the normalized mutual inductance between the exemplary pair of transmitter and receiver coils of FIG. 9A when the receiver is positioned on top of the diagonal scan 904 of FIG. 9B. The several charts on this figure represent the reduction of the maximum mutual inductance that can be achieved for an increasing design variable 901. Note that although the maximum mutual inductance has been decreased, the base value 905, which corresponds to the value observed when the receiver coil is on the center of the transmitter coil main plain 401a, has being maintained.

A displacement of the turns' vertices in the negative direction relative to the main coil plane 401a has been depicted in FIG. 4. Note that the displacement can also have been done in the positive direction relative to the main plane 401a, as exemplified by FIG. 10. Such a mechanical transformation would also exhibit the same advantageous effect as that shown in FIGS. 9A-9D but considering that the transmitter coil is inverted as in FIG. 10 and the receiver device 505 is placed under the transmitter coil.

FIG. 11 shows that there could be implementations in which at least the most-inner turn has its vertices on the same main plain 401a of the coil 400, i.e., not all of the vertices of a coil have been displaced with respect to the main plain.

FIG. 12 shows that is also possible in other implementations to have varying winding parameters for the transmitter coil 400, for example, having differing width or spacing of the conductor material or between each turn of the coil. This specific implementation shows a transmitter coil 400 having different spacing between the turns. It is easy to imagine the transmitter coil in FIG. 11 having different spacing, in such a case at least the most-inner turn could also lie on the same plane 401a as the transmitter coil 400. Having a different spacing between the turns of the transmitter coil has the advantage of creating a more uniform magnetic field on the surface of the transmitter coil.

Figure 13:
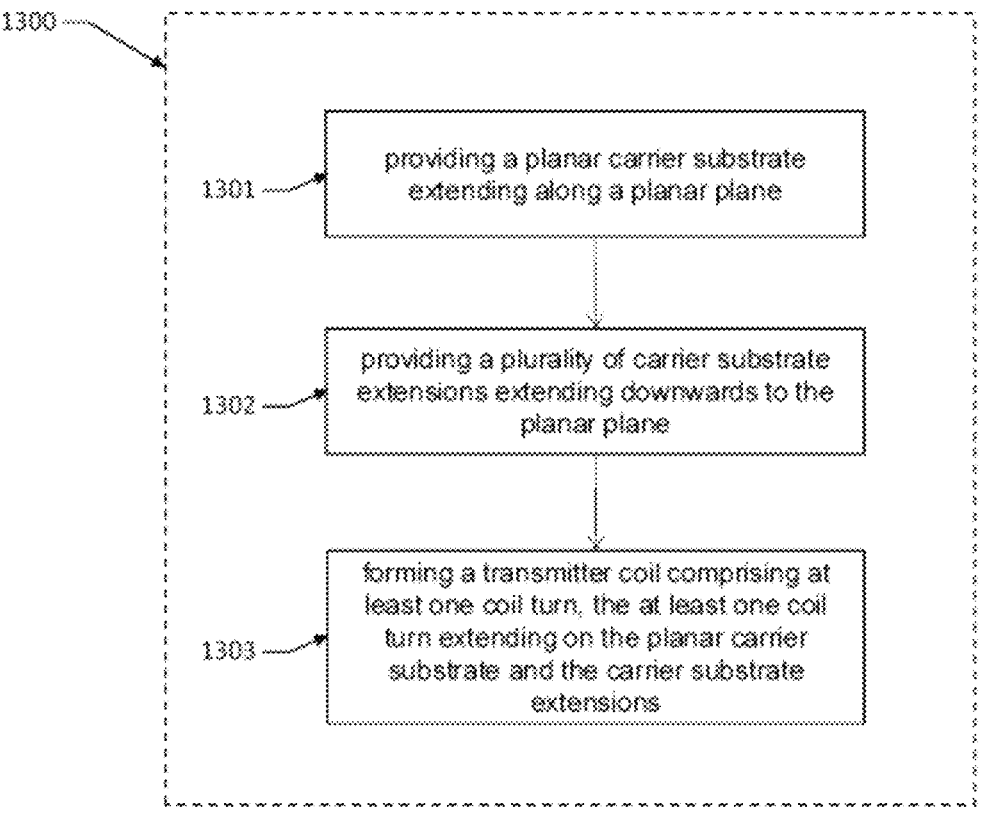
FIG. 13 shows a schematic diagram illustrating a method for manufacturing a wireless power transmitter according to the disclosure.

FIG. 13 shows a schematic diagram illustrating a method 1300 for manufacturing a wireless power transmitter according to the disclosure.

The method 1300 can be used for manufacturing a wireless power transmitter 501 for increasing uniformity of a generated electromagnetic field 503 distribution in a direction perpendicular to a planar plane 401a and for powering at least one electronic device 507 from the generated electromagnetic field 503.

The method 1300 comprises: providing 1301 a planar carrier substrate 701 extending along a planar plane 401a, the carrier substrate 701 having a plurality of corners.

The method 1300 comprises: providing 1302 a plurality of carrier substrate extensions 702 extending downwards to the planar plane 401a, the carrier substrate extensions (702) being electrically and mechanically connected to the planar carrier substrate 701 at respective corners of the planar carrier substrate 701.

The method 1300 comprises: forming 1303 a transmitter coil 400 comprising at least one coil turn, the at least one coil turn extending on the planar carrier substrate 701 and the carrier substrate extensions 702.

The solutions presented in this disclosure are applicable to wireless power receiver devices like smartphones, wearables like smartwatches, fitness bands, virtual reality headsets and hand-controllers, over-ear headphones, tablets, portable computers, smart glasses, gaming controllers, desktop accessories like a mouse or keyboard, battery banks, remote controls, hand-held terminals, e-mobility devices, portable gaming consoles, portable music players, key fobs, drones used in wireless power transfer systems that allow a high-degree of freedom of the receiver.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the disclosure has been described with reference to one or more particular embodiments, those skilled in the art recognize that many changes may be made thereto without departing from the scope of the disclosure. It is therefore to be understood that within the scope of the appended claims and their equivalents, the disclosure may be practiced otherwise than as specifically described herein.

The invention claimed is:

1. A wireless power transmitter comprising:
   a planar plane;
   a transmitter coil comprising at least one coil turn configured to generate an electromagnetic field, wherein the at least one coil turn comprises:
      a plurality of first linear sections arranged to enclose the planar plane; and
      a plurality of second linear sections formed to extend angularly to the planar plane and electrically coupled to the first linear sections,
      wherein the at least one coil turn extends along the first linear sections and the second linear sections, and
      wherein the at least one coil turn is angular;
   a planar carrier substrate extending along the planar plane, wherein the planar carrier substrate carries the first linear sections; and a plurality of carrier substrate extensions carrying the second linear sections.

2. The wireless power transmitter of claim 1, wherein the first linear sections are arranged alternately with every two contiguous sections of the second linear sections.

3. The wireless power transmitter of claim 1, wherein the at least one coil turn forms a polygonal geometric figure whose corners are bent angularly to the planar plane.

4. The wireless power transmitter of claim 3, wherein the corners are bent to the planar plane under a positive angle or a negative angle.

5. The wireless power transmitter of claim 3, wherein the corners are bent to the planar plane at a same height or at a same depth.

6. The wireless power transmitter of claim 3, wherein the corners are bent away from the planar plane according to a slope profile.

7. The wireless power transmitter of claim 1, wherein the transmitter coil further comprises at least one second coil turn extending completely along the planar plane without a displacement from the planar plane.

8. The wireless power transmitter of claim 7, wherein the at least one second coil turn is an inner coil turn with respect to the at least one coil turn.

9. The wireless power transmitter of claim 1, wherein each of the at least one coil turn has a different spacing.

10. The wireless power transmitter of claim 1, wherein corners of the at least one coil turn are rounded.

11. The wireless power transmitter of claim 1, wherein the planar carrier substrate comprises corners electrically and mechanically connecting the carrier substrate extensions to the planar carrier substrate.

12. The wireless power transmitter of claim 11, wherein the corners are bent to the planar plane to form the carrier substrate extensions.

13. The wireless power transmitter of claim 11, further comprising rigid carrier substrates coupled via respective flexible carrier substrates to the planar carrier substrate, wherein the rigid carrier substrates form the carrier substrate extensions.

14. The wireless power transmitter of claim 11, further comprising flexible carrier substrates coupled to the planar carrier substrate, wherein the flexible carrier substrates form the carrier substrate extensions.

15. The wireless power transmitter of claim 11, further comprising rigid carrier substrates coupled via connectors to the planar carrier substrate, wherein the rigid carrier substrates form the carrier substrate extensions.

16. The wireless power transmitter of claim 15, wherein the connectors comprise at least one of:

a third substrate with electrically conductive tracks;

an array of conductive elements;

a pin header; or a combination of a male and a female pin header configured to electrically connect the first linear sections with the second linear sections.

17. The wireless power transmitter of claim 1, wherein corners of the at least one coil turn are angular.

18. The wireless power transmitter of claim 1, wherein each of the at least one coil turn is angular, and wherein each corner of the at least one coil turn is rounded.

19. The wireless power transmitter of claim 1, wherein each of the at least one coil turn has a different conductor width.

20. A method comprising:

providing a planar carrier substrate extending along a planar plane, wherein the planar carrier substrate comprises a plurality of corners;

providing a plurality of carrier substrate extensions extending downwards to the planar plane, wherein the carrier substrate extensions are electrically and mechanically connected to the planar carrier substrate at respective corners of the planar carrier substrate; and forming a transmitter coil comprising at least one coil turn, wherein the at least one coil turn extends on the planar carrier substrate and the carrier substrate extensions.

* * * * *